(12) United States Patent
Gordon et al.

(10) Patent No.: US 9,548,905 B2
(45) Date of Patent: Jan. 17, 2017

(54) SCHEDULED WORKLOAD ASSESSOR (71) Applicant: Bank of America Corporation, Charlotte, NC (US)

(72) Inventors: Candace Gordon, Jacksonville, FL (US); Jackie E. McCoy-Rangel, Indian Land, SC (US); Kavitha Karuppiah, Atlanta, GA (US)

(73) Assignee: Bank of America Corporation, Charlotte, NC (US)

( * ) Notice: Subject to any disclaimer, the term of this patent is extended or adjusted under 35 U.S.C. 154(b) by 361 days.

(21) Appl. No.: 14/204,370

(22) Filed: Mar. 11, 2014

(65) Prior Publication Data

US 2015/0263908 A1     Sep. 17, 2015

(51) Int. Cl.
*H04L 12/24* (2006.01)

(52) U.S. Cl.
CPC ....... *H04L 41/5032* (2013.01); *H04L 41/5012* (2013.01)

(58) Field of Classification Search
CPC ............. H04L 12/2417; H04L 41/5006; H04L 41/5009; H04L 47/2425
See application file for complete search history.

(56) References Cited

U.S. PATENT DOCUMENTS

| 8,462,014 | B1 * | 6/2013 | Kardos | ................. | H02J 13/001 340/870.02 |
| 2002/0143920 | A1 * | 10/2002 | Dev | ........................ | H04L 41/06 709/223 |
| 2005/0159969 | A1 * | 7/2005 | Sheppard | ............... | G06Q 10/00 705/7.36 |
| 2005/0228878 | A1 * | 10/2005 | Anstey | .................... | H04L 43/16 709/224 |
| 2006/0248118 | A1 * | 11/2006 | Curtis | ................. | H04L 43/0817 |
| 2007/0263541 | A1 * | 11/2007 | Cobb | ................. | H04L 12/2602 370/235 |
| 2008/0010293 | A1 * | 1/2008 | Zpevak | .................. | G06Q 10/06 |
| 2008/0056141 | A1 * | 3/2008 | Sheinfeld | ................ | H04L 41/06 370/244 |

(Continued)

OTHER PUBLICATIONS

EP 1 981 221 A1, Sun, Junbai, A service restoring method and device, Oct. 10, 2008.*

*Primary Examiner* — Backhean Tiv
(74) *Attorney, Agent, or Firm* — Banner & Witcoff, Ltd.; Michael A. Springs (57) ABSTRACT

Systems, methods and apparatuses for receiving data associated with various service level agreements configured to run on a system are provided. Data associated with various functions, tools, applications, and the like, configured to run on a system may be received and a portion of the data may be extracted. The extracted data may include an identifier of service level agreement, a running time of the service level agreement, and the like. The system may receive user input requesting identification of all service level agreements running in a particular time period. One or more service level agreement may then be identified meeting the parameters. In other examples, a determination may be made that a system outage has occurred. One or more service level agreements running when the outage occurred may be identified. A progress of the service level agreements may be determined to aid in recovery of the system.

17 Claims, 7 Drawing Sheets

(56) References Cited

U.S. PATENT DOCUMENTS

| | | | |
|---|---|---|---|
| 2009/0010264 A1* | 1/2009 | Zhang | H04L 47/2425 370/395.21 |
| 2009/0234996 A1* | 9/2009 | Bugenhagen | H04L 41/5003 710/105 |
| 2009/0279444 A1* | 11/2009 | Ravindran | H04L 41/5003 370/252 |
| 2012/0023501 A1* | 1/2012 | Chi | G06Q 30/0283 718/103 |
| 2014/0052850 A1* | 2/2014 | Doorhy | H04L 43/0876 709/224 |
| 2014/0129588 A1* | 5/2014 | Chi | G06F 17/30979 707/769 |
| 2014/0337510 A1* | 11/2014 | Gesmann | H04L 41/5009 709/224 |
| 2015/0195149 A1* | 7/2015 | Vasseur | H04L 41/5009 370/252 |
| 2015/0207696 A1* | 7/2015 | Zhang | H04L 41/5009 709/224 |
| 2015/0263908 A1* | 9/2015 | Gordon | H04L 41/5032 709/223 |
| 2016/0150030 A1* | 5/2016 | Apte | H04L 41/5025 709/226 |

* cited by examiner

SERVICE LEVEL AGREEMENT OUTPUT  550

START DATE: XX/XX/XXXX
END DATE: YY/YY/YYYY         ⎫ 552
START TIME: ZZ:ZZ
END TIME: VV:VV

554

| DATE | ID | NAME | FREQUENCY | START | END | DURATION | STATUS |
|---|---|---|---|---|---|---|---|
| XX/XX/XXXX | AAAA | NAME 1 | DAILY | CC:CC | DD:DD | EE:EE | COMPLETE |
| YY/YY/YYYY | BBBB | NAME 2 | DAILY | FF:FF | GG:GG | HH:HH | IN PROGRESS |
| VV/VV/VVVV | CCCC | NAME 3 | DAILY | JJ:JJ | KK:KK | LL:LL | IN PROGRESS |
| ZZ/ZZ/ZZZZ | DDDD | NAME 4 | DAILY | MM:MM | NN:NN | PP:PP | COMPLETE |

556  EXPORT

SCHEDULED WORKLOAD ASSESSOR

BACKGROUND

Large companies and other entities often have complex information technology systems that span multiple different platforms. Multiple different tools and types of tools may be part of the overall information technology system. Accordingly, should an outage occur, it may be difficult to identify tools, functions, applications, and the like, that were running at the time the outage occurred and may have been interrupted. In particular, when tools are housed across multiple different platforms, efficiently identifying tools, functions, applications, and the like, affected by an outage can be difficult and time consuming, and may needlessly delay the recovery of the system.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for receiving data associated with various projects and/or service level agreements configured to run on a system. For instance, receiving data associated with various functions, tools, applications, and the like, configured to run on a system. In some examples, a portion of the service level agreement data associated with a project and/or service level agreement may be extracted. For instance, extracted data may include an identifier of the service level agreement, a running time of the service level agreement, and the like. Accordingly, in some examples, the system may receive user input requesting identification of all service level agreements running in a particular time period. One or more service level agreements may then be identified meeting the time period parameters based, at least in part, on the extracted data.

In other examples, a determination may be made that a system outage has occurred. Accordingly, one or more service level agreements running when the outage occurred may be identified. A progress of the service level agreements may also be determined in order to aid in recovery of the system.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Large companies often have complex information technology systems stretching across multiple platforms and including a variety of tools, functions, applications, and the like. Aspects of the arrangements described herein relate to identifying service level agreements (e.g., tools, functions, applications, and the like) running during a particular time period. The time period may be specified by a user and may further including additional search parameters such as technology or environment. In some examples, a system may determine that an outage of a system has occurred and may automatically determine the service level agreements running when the outage occurred to aid in efficient recovery of the system. These and various other aspects will be discussed more fully below.

Figure 1:
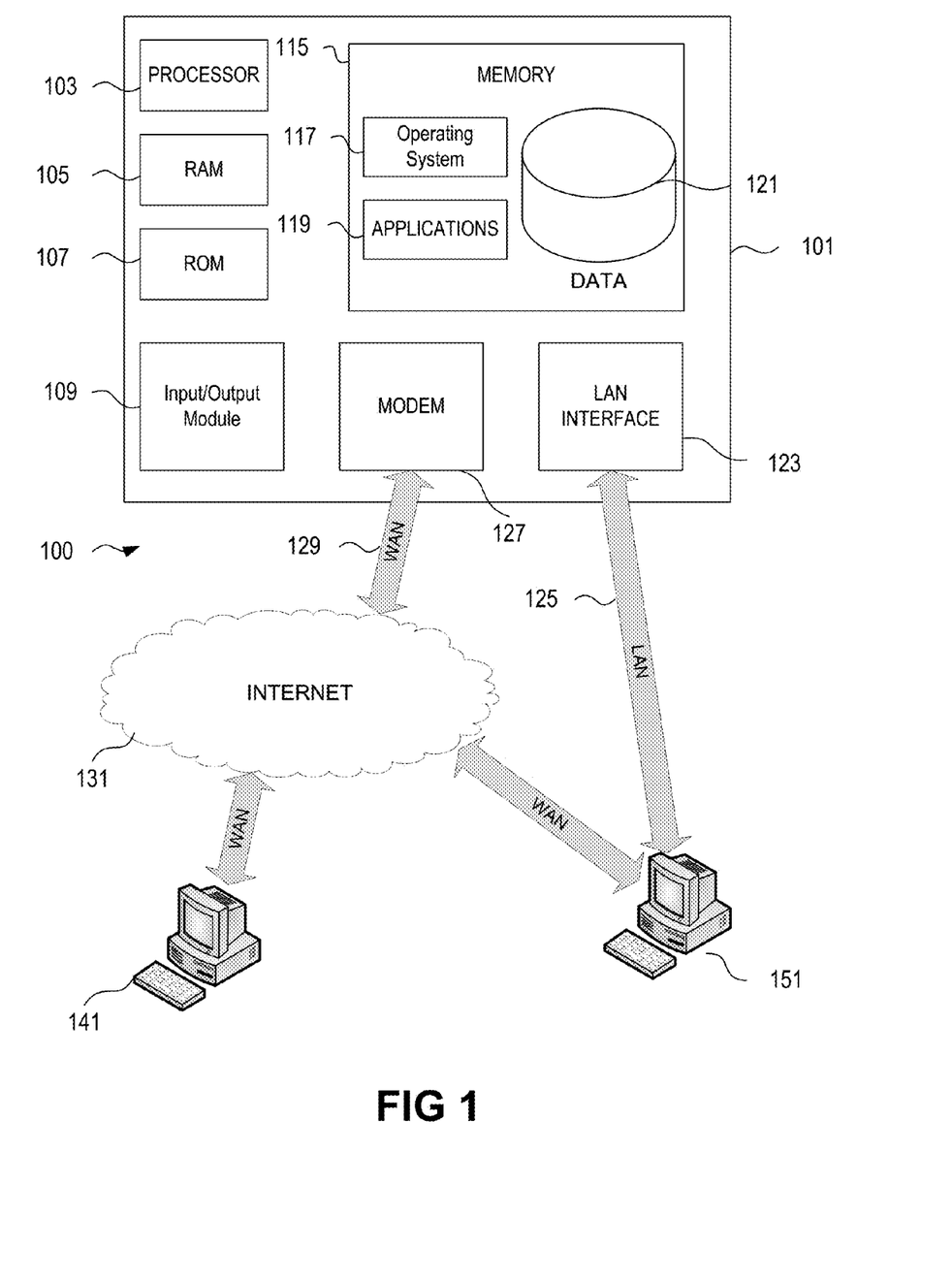
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
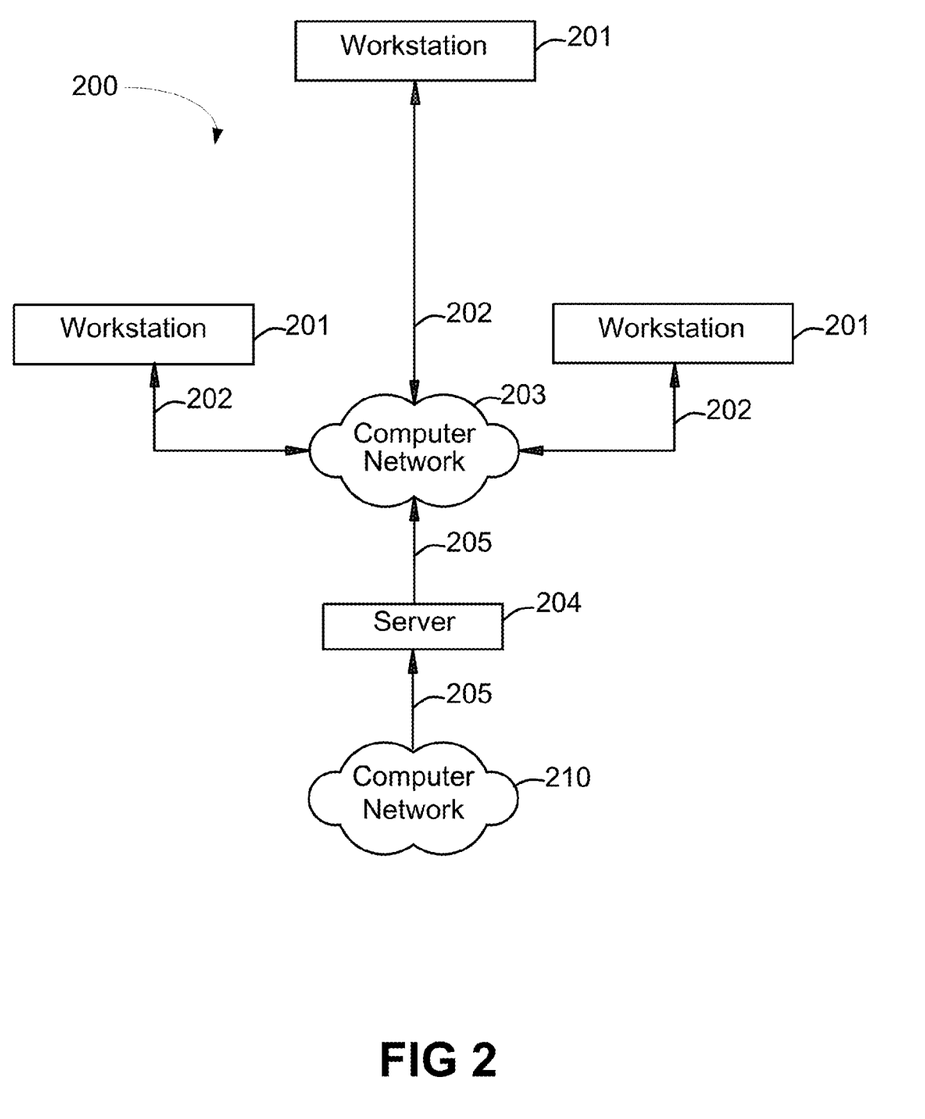
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
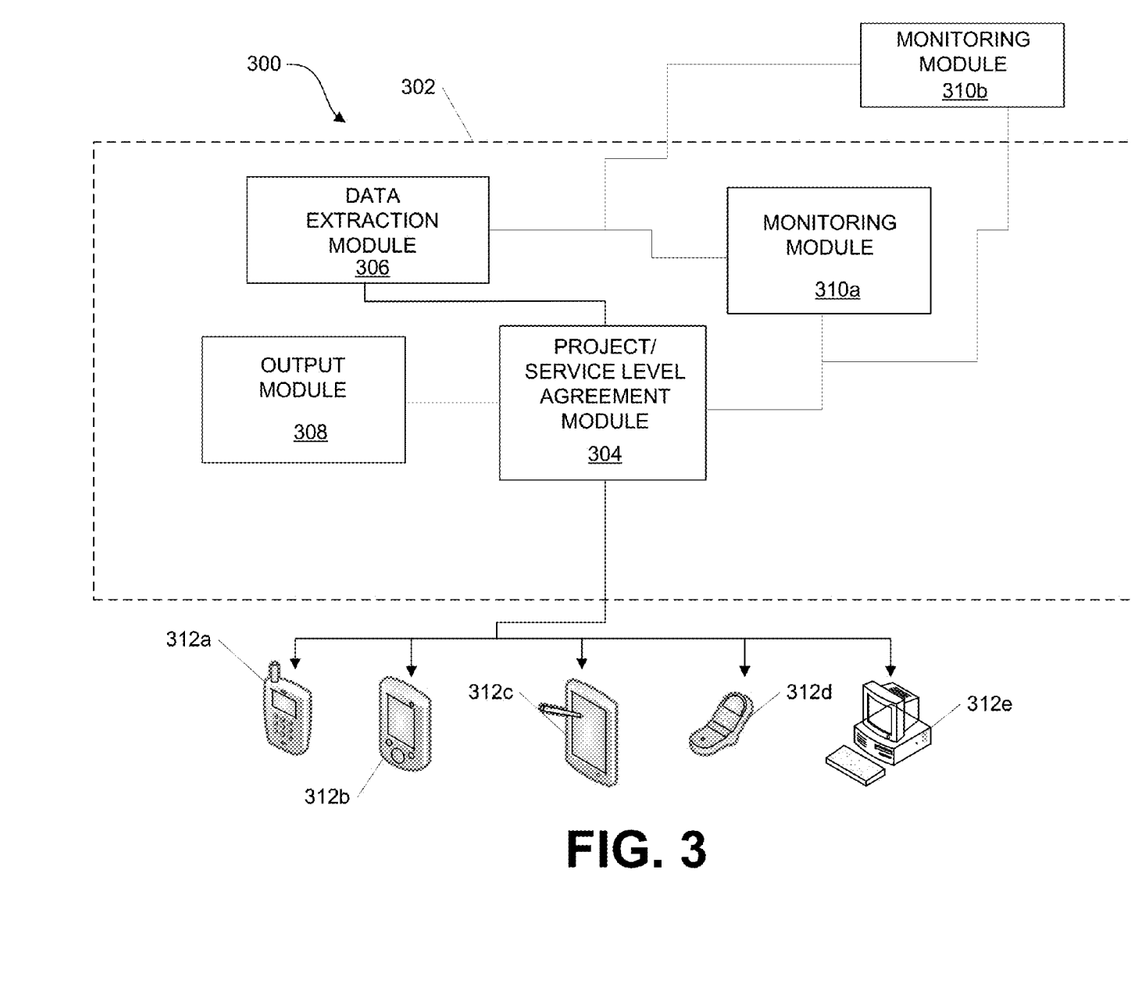
FIG. 3 illustrates an example service level agreements tracking system according to one or more aspects described herein.

FIG. 3 illustrates one example project and/or service level agreements tracking system 300 according to one or more aspects described herein. In some examples, the tracking system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the tracking system to use within a financial institution. Rather, the system may be implemented by various other types of entities.

The tracking system 300 may include one or more modules that may include hardware and/or software configured to perform various functions within the system 300. For instance, each module may include one or more aspects of computing device 101 in FIG. 1 or computing system environment 100 in FIG. 1.

The tracking system 300 may include a project/service level agreement module 304. The project/service level agreement module 304 may be connected to or in communication with various other modules within the system 300. Further, the project/service level agreement module 304 may receive and/or store information associated with one or more projects and/or service level agreements. In some examples, projects may include delivery of newly requested objects, such as information technology objects (e.g., functions, applications, and the like), based upon a business request and/or delivery parameters (e.g., an entity may request an object or project and may provide expected delivery parameters). Projects may include various service level agreements or other information technology focused applications running or contained within a data warehouse. Projects and/or service level agreements may include applications or functions running during a testing phase of the function (e.g., during a warranty period), during production or full implementation of the function, or at various other phases of implementation. Information associated with the project and/or service level agreement may include a name of the project or a service level agreement associated therewith, a unique identifier (e.g., a numeric or alpha-numeric identifier) of the project and/or service level agreement, a frequency at which the service level agreement runs, a start time or estimated start time of the project and/or service level agreement, an end time or estimated end time of the project and/or service level agreement, a duration of the run of the project and/or service level agreement, a type of project or service level agreement, a contact person associated with the project or service level agreement, the phase or implementation level of the project or service level agreement (e.g., warranty, production, or the like), as well as various other types of information. In some examples, service level agreements may include a data delivery time determined or requested during the project inception.

The project/service level agreement module 304 may receive projects and/or service level agreements from one or more computing devices, such as computing devices 312a-312e. The project/service level agreement module 304 also may receive projects and/or service level agreements from one or more other systems having one or more computing devices. Project/service level agreement module 304 may also be connected to or in communication with data extraction module 306. Data extraction module 306 may extract particular information associated with each service level agreement from data stored in the project/service level agreement module 304. For instance, data extraction module 306 may extract data such as a service level agreement name and/or identifier, start or run time for a project, service level agreement (SLA) time (e.g., time to deliver SLA which may be after run time), and the like. In some arrangements, the data extraction module may also extract information such as an administrator or contact person associated with a service level agreement. The data may be extracted for some or all service level agreements in the project/service level agreement module 304 and may be extracted when the service level agreement is added to the project/service level agreement module 304 or anytime thereafter. In some examples, the data extraction module 306 may scan or review the project/service level agreement module 304 on a periodic or aperiodic basis to determine whether desired information has been extracted for some or all service level agreements in the project/service level agreement module 304.

In some examples, the extracted data may be transmitted to a monitoring module 310. The monitoring module 310 may scan or otherwise monitor one or more systems, environments, data warehouses, and the like, to determine or identify projects and/or service level agreements running at any given time. The monitoring module 310 may be internal to or associated with the system 300, such as monitoring module 310a, or may be a separate server external to or not associated with the system, such as monitoring module 310b. In some examples, a user may input, e.g., via one or more computing devices 312a-312e, a request to determine or identify the service level agreements running at a particular time. For instance, user input may be received from a smart phone 312a, personal digital assistant (PDA) 312b, tablet computing device 312c, cell phone 312d, and/or other computing device 312e. This information may be used to plan downtime, and the like, while minimizing disruptions. The user may request identification of service level agreements running by identifying a start and end date, start and end time, and the like, to determine the desired time period and any projects and/or service level agreements running during the identified period will be identified. Various aspects of these arrangements will be discussed more fully below.

In some examples, the monitoring module 310 may monitor systems, such as a data warehouse, for an outage. Upon detecting an outage, the monitoring module 310 may determine, based, at least in part, on extracted data from the data extraction module 306, the service level agreements that were running during the outage. The monitoring module 310 may also determine a status or progress of any service level agreements that were running during the outage. For instance, any service level agreements that were interrupted due to the outage may be identified and, in some arrangements, a status or progress of the service level agreement may also be determined. For instance, the monitoring module 310 may identify one or more service level agreements running during the outage that were interrupted and may determine how far each service level agreement was into the duration of the run time to aid in the restoration process. In some examples, the monitoring module 310, and/or various other modules within the system 300, may identify service level agreements interrupted that will be restored when the outage has ended. In some arrangements, these service level agreements may be prioritized by the system to ensure that high priority service level agreements are restored before lower priority service level agreements.

In some examples, one or more aspects may be performed automatically by the system. For instance, upon detecting an outage, the monitoring module 310 may automatically determine or identify service level agreements running during the outage. Additionally or alternatively, the monitoring module 310 may automatically identify a status or progress of service level agreements interrupted due to the outage. Further, the monitoring module 310 may automatically prioritize service level agreements for restoration.

The tracking system 300 may further include an output module 308. The output module 308 may generate one or more reports providing information about projects and/or service level agreements running during various time periods, outages and projects and/or service level agreements affected by the outage, and the like. In some examples, data associated with service level agreements running during particular time periods may be exported to one or more software programs for further manipulation, integration into other reports, and the like.

These and various other arrangements will be discussed more fully below.

Figure 4:
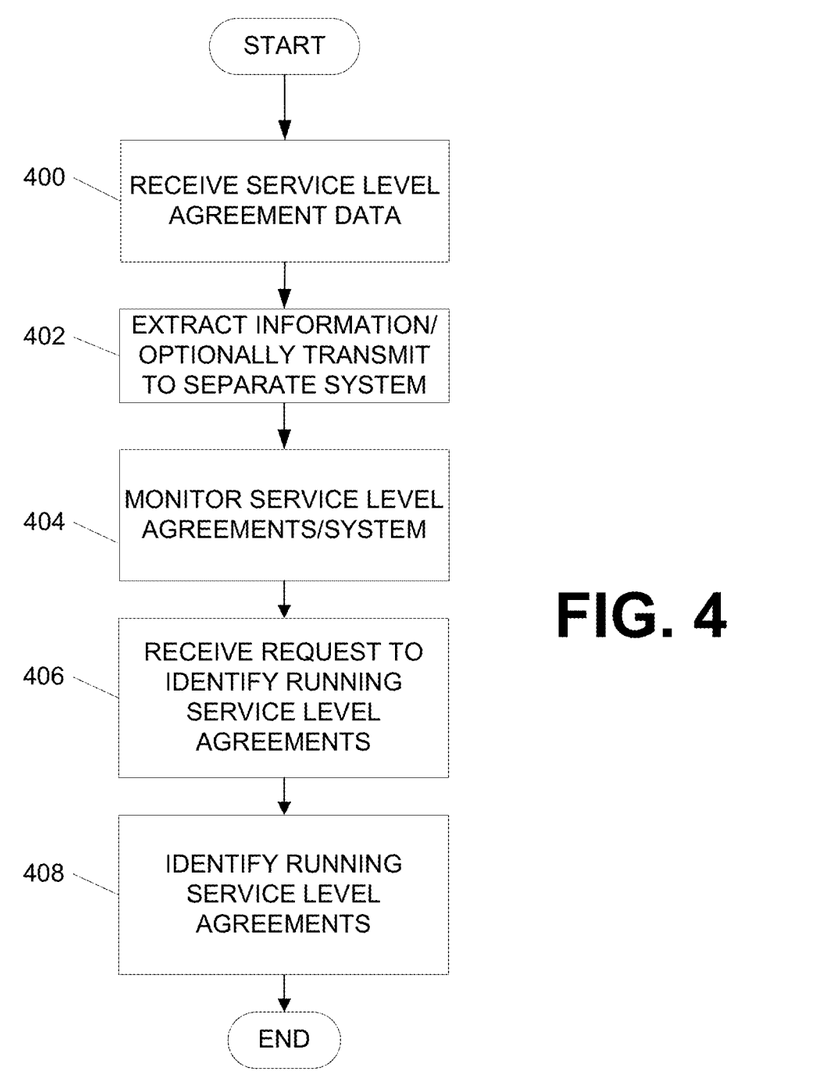
FIG. 4 is an example method of identifying service level agreements running during an identified time period according to one or more aspects described herein.

FIG. 4 illustrates one example method of identifying service level agreements running during an identified time period according to one or more aspects described herein. In step 400, service level agreement data is received. As discussed above, the received service level agreement data may include a name of the application, unique identifier associated with the service level agreement, start time or estimated start time of the project and/or service level agreement, end time or estimated end time of the service level agreement, duration of the service level agreement, administrator or contact person associated with the service level agreement, and the like. The project/service level agreement data may be stored, for instance, in one or more databases within the system.

In step 402, information or data is extracted from the service level agreement data. As discussed above, information extracted from the service level agreement data may include a name or identifier associated with the service level agreement, a start time, an end time, a duration, and the like. In some examples, data may be extracted for each service level agreement within a system. In other examples, data may be extracted for a portion of the service level agreements within a system.

Optionally, the extracted data may be transmitted to a separate server or system. For instance, the extracted data may be transmitted to a server or system separate from, external to, or the like, the system storing the service level agreements data. In some examples, transmitting the extracted data may include copying the data to the separate server or system such that the data is stored on multiple servers or systems. These arrangements may aid in ensuring that, if a system-wide outage should occur, the extracted data would like remain accessible to determine or identify the service level agreements running when the outage occurred and to assist in the restore process.

In step 404, the application, service level agreement, status, and the like, may be monitored such that any request to identify service level agreements running may be received and the appropriate service level agreements identified. In step 406, a request to identify service level agreements running may be received. In some examples, the request may include a specific start date or end date, date range, start time, end time, duration, or the like. The request may be received by the system via one or more computing devices, such as computer devices 312*a*-312*e* in FIG. 3. In some examples, the request may also include a request to sort or filter the service level agreements. For instance, the request may include a request to filter only service level agreements running in a certain environment, of a certain technology, or the like. In other examples, the request may include a request to sort the service level agreements by environment, technology or the like.

Figure 5A:
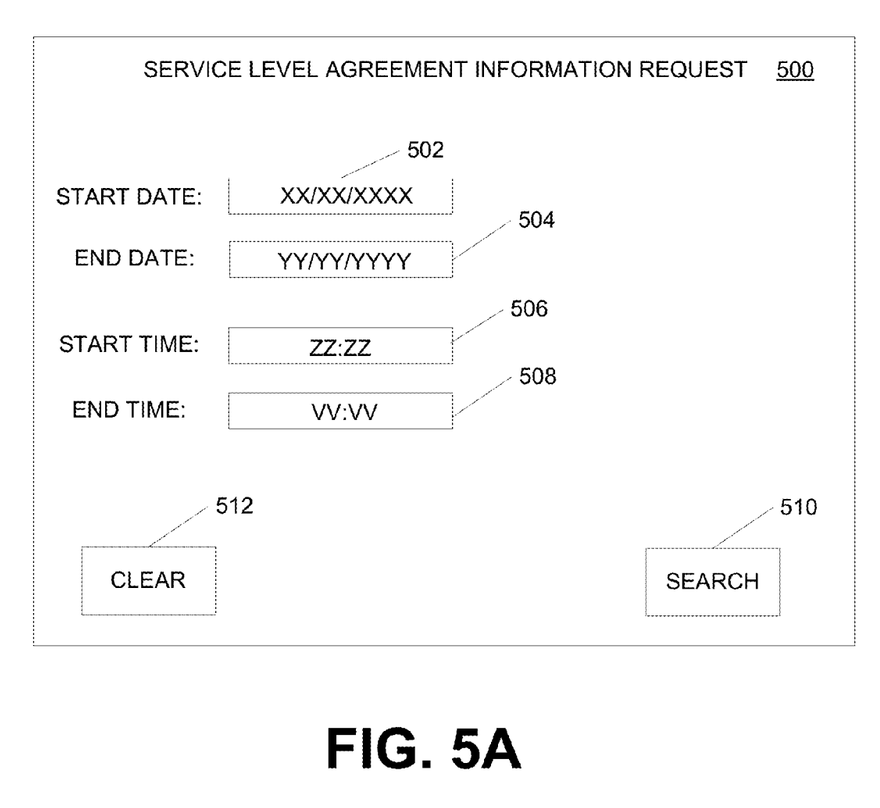
FIGS. 5A and 5B illustrate example user interfaces for providing parameters to identify service level agreements according to one or more aspects described herein.

FIG. 5A illustrates one example user interface for identifying the search parameters for determining service level agreements running during a period of time. The interface 500 includes fields in which a user may indicate various search parameters. For instance, the user may indicate a date range in which to identify service level agreements running by providing a start date in field 502 and an end date in field 504. Additionally or alternatively, the user may indicate a time range in which to identify service level agreements running by providing a start time in field 506 and an end time in field 508. Various other search parameters may be provided by the user, though they are not shown in the example interface 500 of FIG. 5A. For instance, a user may indicate one or more filters or sorting options (e.g., technology, environment, and the like). Additionally or alternatively, the user may indicate duration as a parameter for identifying service level agreements running, frequency of the service level agreement (e.g., daily, weekly, and the like), as well as various other parameters. Once the desired parameters are set, a user may select "SEARCH" option 510. Alternatively, a user may select "CLEAR" option 512 to clear any entries made.

With further reference to FIG. 4, in step 408, the service level agreements running for the requested parameters may be identified and/or provided to the requesting party. In some examples, the service level agreements may be provided in a list on a graphical user interface, as will be discussed more fully below. In some arrangements, the identified service level agreements may be exported to a software program that may permit additional manipulation of the results, presentation of the results, and the like.

Figure 5B:
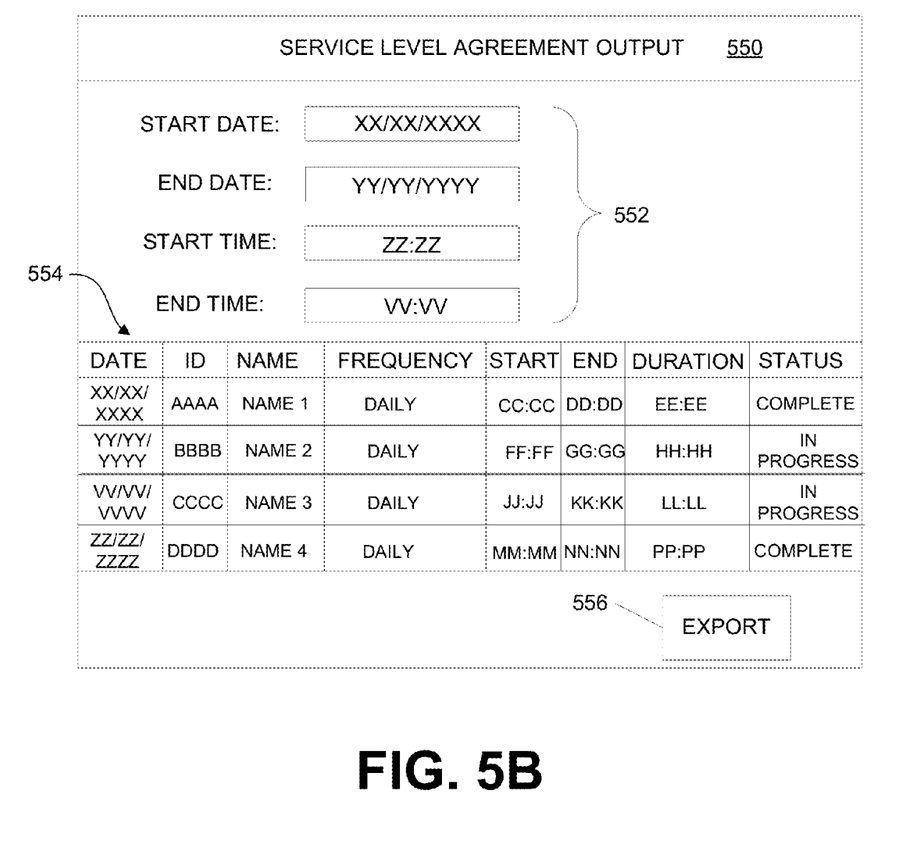

FIG. 5B illustrates one example user interface 550 illustrating one example listing of search results identifying service level agreements running during the desired time period. Interface 550 includes an upper region 552 indicating the search parameters used to provide the results. Region 554 provides a listing of service level agreements identified as running during the time and/or date periods provided in the search parameters. As shown in region 554, the results include a date of the service level agreement running, a name and identifier of the service level agreement, a frequency of the service level agreement, start time, end time, and duration. The results also indicate a status of each service level agreement during the time frame provided. In some examples in which an outage has occurred, the status information may be used to aid in the restoration of the system, as is discussed more fully herein.

The search results and information provided in region 554 are merely some examples of the presentation of results. Various other presentations may be provided without departing from the invention. Further, additional information may be provided in the results without departing from the invention. For instance, the results may include an administrator or contact person associated with a service level agreement, an identification of whether the service level agreement is in warranty or in production, and the like. In some examples, the results may be exported, as discussed above, by selecting "EXPORT" option 556.

The results identifying service level agreements running may be used to more efficiently plan for downtime or planned outages by permitted administrators, users, or the like to identified time periods when an outage or downtime would be least disruptive.

Further, identifying service level agreements running for a certain period may permit a user to schedule downtime or an outage for a time when lower priority service level agreements are running. For instance, the service level agreements identified as running for the particular time period requested may indicate a priority of the service level agreement. Accordingly, an administrator may schedule downtime for a time period when fewer high priority service level agreements are running. In some examples, the downtime may be schedule for a time when high priority service level agreements are below a threshold percentage of the total service level agreements running during the time period. For instance, downtime may be scheduled when high priority service level agreements are less than, for example, 50%, 40%, 25% or the like, of the total service level agreements running during that time period.

Figure 6:
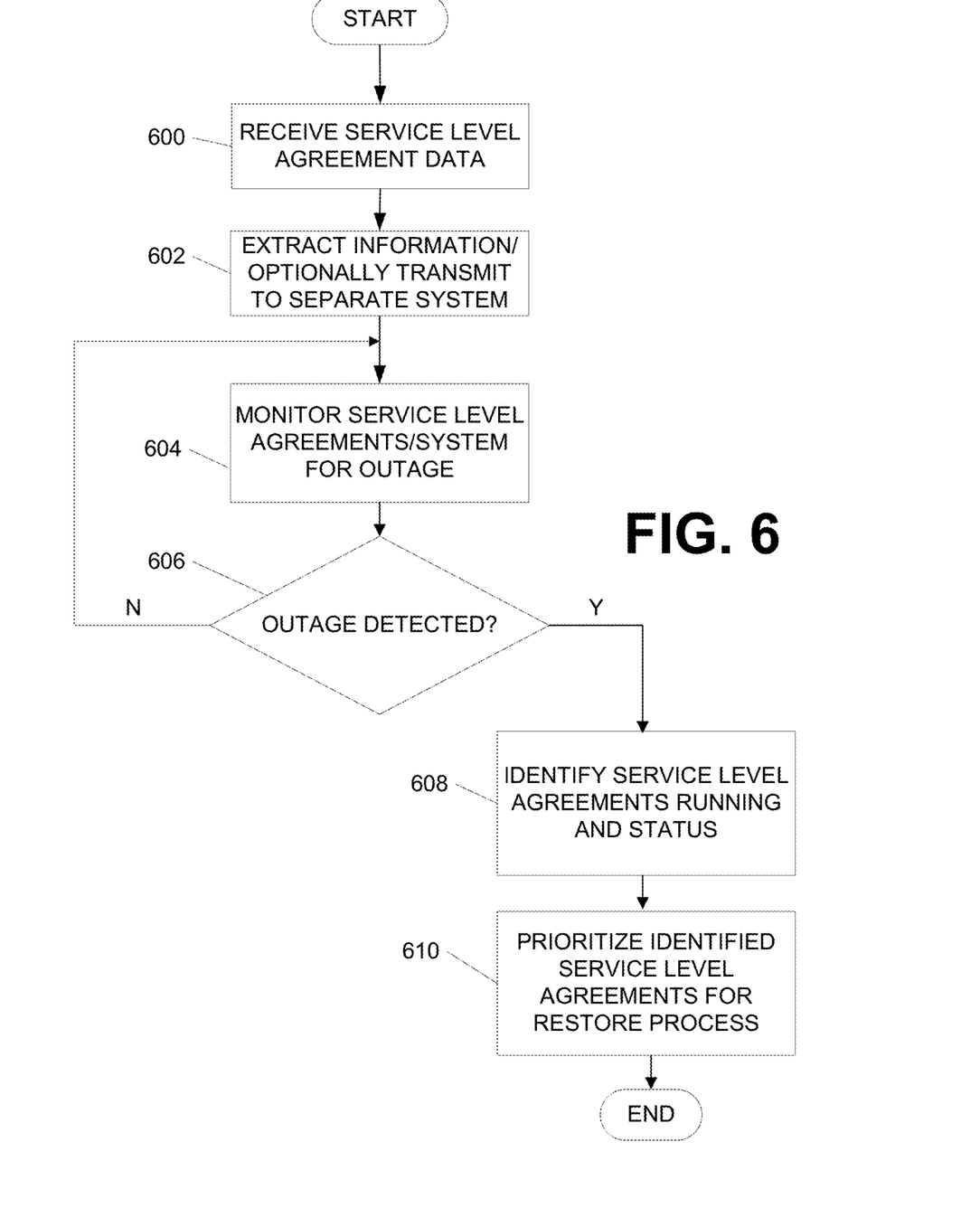
FIG. 6 is an example method of identifying service level agreements running when an outage occurs according to one or more aspects described herein.

FIG. 6 illustrates another example method of identifying service level agreements running when an outage occurs according to one or more aspects described herein. In step 600, project/service level agreement data may be received, similar to the arrangements discussed above. In step 602, information is extracted related to one or more service level agreements. Similar to step 402, the extracted information may include a name and/or identifier of the service level agreement, a duration, start time, end time, or the like. Optionally, the extracted data may be transmitted to a server or system separate from the system extracting the data to provide additional security during a system-wide outage, as discussed above.

In step 604, the service level agreements and/or system are monitored for an outage. In step 606, a determination is made as to whether an outage has occurred. If not, the process may return to step 604 to continue monitoring for an outage. If, in step 606, an outage has occurred, any service level agreements running when the outage occurred may be identified in step 608. In some examples, a status or progress of the one or more service level agreements identified may also be determined. This information may be used to assist in the restoration process. For instance, an administrator or other individual working to restore the system may be able to easily identify the service level agreements interrupted and may resume the service level agreements at an appropriate point. This may improve efficiency, time to full restore, and the like, because service level agreements may not need to be restarted from a beginning but rather, because the status or progress of the service level agreement at the time of the outage is known, may resume from the point of the interruption.

In step 610, the one or more service level agreements identified as running when the outage occurred may be prioritized for restoration. In some examples, the system may automatically determine a priority of the identified service level agreements and may then prioritize the service level agreements in the restoration process.

As discussed herein, the process of efficiently identifying service level agreements running during a particular time period may aid in planning outages, downtime, and the like. In addition, efficiently determining the service level agreements running when an outage occurred may aid in restoring the system quickly and efficiently. Further, identifying the service level agreements running when the outage occurred, as well as the status or progress of each service level agreement, may aid in estimating a time to full recovery or operation of the system. Further, the arrangements described herein may aid in automating some or all aspects of a system recovery by providing a system to identify service level agreements running when an outage occurred, a priority of the service level agreements, and a progress of the service level agreements. The system may then automatically initiate and/or complete a recovery or restoration of the system based on this information.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
   at least one processor; and
   a memory storing computer-readable instructions that, when executed by the at least one processor, cause the apparatus to:
   receive data associated with at least a first service level agreement configured to run on a first computing device;
   extract service level agreement data associated with the first service level agreement from the received data, wherein the extracted service level agreement data includes at least a running time of the first service level agreement;
   copying the extracted service level agreement data to a second computing device separate from the first computing device;
   store the extracted service level agreement data by the second computing device;
   receive user input requesting identification of one or more service level agreements running at a time period, the time period being defined by a start date and end date, and a start time and end time;
   identify one or more service level agreements running at the time period based on the extracted service level agreement data and data associated with at least a second service level agreement; and
   filter the identified one or more service level agreements running at the time period based on an environment in which the service level agreement is running.

2. The apparatus of claim 1, further including displaying the identified one or more service level agreements running at the time period via a user interface.

3. The apparatus of claim 1, wherein the extracted data further includes an identifier associated with the first service level agreement.

4. The apparatus of claim 3, wherein the identifier is stored in association with the running time.

5. The apparatus of claim 1, wherein the requesting identification of one or more service level agreements running at the time period includes a request to identify all service level agreements running at the time period.

6. The apparatus of claim 1, further including instructions that, when executed, cause the apparatus to:
   receive data associated with a plurality of service level agreements running on the first computing device;
   extract service level agreement data from the received data associated with the plurality of service level agreements, wherein the extracted service level agreement data includes at least a running time of each service level agreement of the plurality of service level agreements;
copy the extracted service level agreement data for each service level agreement to the second computing device separate from the first computing device; and
store the extracted service level agreement data for each service level agreement by the second computing device.

7. An apparatus, comprising:
at least one processor; and
a memory storing computer-readable instructions that, when executed by the at least one processor, cause the apparatus to:
receive data associated with a plurality of service level agreements configured to run on a computing device;
extract, from the received data, service level agreement data for each service level agreement of the plurality of service level agreements, the extracted service level agreement data including a running time of each service level agreement and an identifier associated with each service level agreement;
monitor a system to determine whether a system-wide outage of the system has occurred;
responsive to determining that an outage has occurred, identify one or more service level agreements of the plurality of service level agreements that were running when the outage occurred based, at least in part, on the extracted data; and
determine a progress of each service level agreement of the one or more service level agreements identified, the progress being determined from a start time of the service level agreement to a time the outage occurred.

8. The apparatus of claim 7, wherein identifying one or more service level agreements of the plurality of service level agreements that were running when the outage occurred is performed automatically upon determining that an outage has occurred.

9. The apparatus of claim 7, further including instructions that, when executed, cause the apparatus to:
restore the system by restoring each service level agreement of the one or more identified service level agreements from a point in the progress at which the outage occurred based on the determined progress of each service level agreement of the one or more service level agreements identified.

10. The apparatus of claim 7, further including instructions that, when executed, cause the apparatus to:
copy the extracted data to a second computing device separate from the computing device; and
store the extracted data on the second computing device.

11. The apparatus of claim 7, further including instructions that, when executed, cause the apparatus to:
determine, for each service level agreement of the one or more identified service level agreement that were running when the outage occurred, a priority level for the service level agreement; and
based on the determined priority level, prioritizing the one or more identified service level agreements for restoring the system.

12. The apparatus of claim 11, wherein the prioritizing is performed automatically.

13. A method, comprising:
receiving, by a system including a first computing device having a processor, data associated with a plurality of service level agreements configured to run on the first computing device;
extracting, from the received data and by the first computing device, service level agreement data for each service level agreement of the plurality of service level agreements, the extracted service level agreement data including a running time of each service level agreement and an identifier associated with each service level agreement;
monitoring, by the computing device, a state of the system to determine whether a system-wide outage of the system has occurred;
responsive to determining that an outage has occurred, identifying, by the first computing device, one or more service level agreements of the plurality of service level agreements that were running when the outage occurred based, at least in part, on the extracted data; and
determine a progress of each service level agreement of the one or more service level agreements identified, the progress being determined from a start time of the service level agreement to a time the outage occurred.

14. The method of claim 13, wherein identifying one or more service level agreements of the plurality of service level agreements that were running when the outage occurred is performed automatically upon determining that an outage has occurred.

15. The method of claim 13, further including:
restoring the system by restoring each service level agreement of the one or more identified service level agreements from a point in the progress at which the outage occurred based on the determined progress of each service level agreement of the one or more service level agreements identified.

16. The method of claim 13, further including:
determining, by the first computing device, for each service level agreement of the one or more identified service level agreements that were running when the outage occurred, a priority level for the service level agreement; and
based on the determined priority level, prioritizing, by the first computing device, the one or more identified service level agreements for restoring the system.

17. The method of claim 16, wherein the prioritizing is performed automatically.

* * * * *